A. E. RICH.

Assignor of two-thirds interest to J. H. Crittenden.

BOTTLE-STOPPER.

No. 7,797. Reissued July 17, 1877.

Witnesses:
Hallock Barnett
Samuel Sea

Inventor
Augustus E. Rich
by Francis Rickoff
his attorney in fact

N. PETERS, PHOTO-LITHOGRAPHER, WASHINGTON, D.C.

UNITED STATES PATENT OFFICE.

AUGUSTUS E. RICH, OF FALL RIVER, MASSACHUSETTS, ASSIGNOR OF TWO-THIRDS INTEREST TO JAMES H. CRITTENDEN.

IMPROVEMENT IN BOTTLE-STOPPERS.

Specification forming part of Letters Patent No. 183,512, dated October 24, 1876; Reissue No. 7,797, dated July 17, 1877; application filed May 8, 1877.

*To all whom it may concern:*

Be it known that I, AUGUSTUS E. RICH, of Fall River, in the county of Bristol and State of Massachusetts, have invented certain new and useful Improvements in Stoppers for Bottles charged with soda-water and other gaseous or aerated liquors; and the following is a description of the same, reference being had to the accompanying drawings, and the letters of reference marked thereon, in which—

Figure 1:
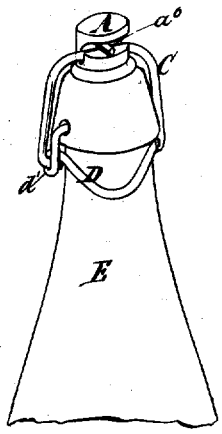
Figure 2:
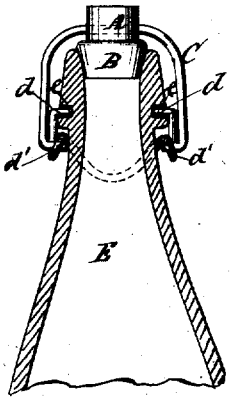
Figure 4:
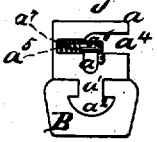
Figure 5:
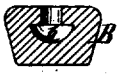
Figure 3:
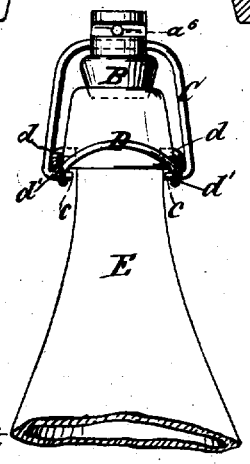

Figure 1 is a perspective view of my improved bottle-stopper secured in the mouth of bottle. Fig. 2 represents a longitudinal section of the same. Fig. 3 is a perspective view of my improved bottle-stopper when the mouth of the bottle is opened, and just before stopping it. Fig. 4 represents a longitudinal section of my improved metallic stopple and rubber stopple affixed to it, and Fig. 5 represents a longitudinal section of the rubber stopple.

The same letters indicate the same parts in the several figures.

The metallic stopple A is constructed with top piece *a*, from the under side of which, about in the center or middle thereof, projects the neck $a^1$, provided at its end with the button $a^2$ of larger diameter than the neck $a^1$, and smaller than the flat under side of the top part, and all formed in one piece.

The top piece *a* has a transverse slot or groove, $a^3$, through it, about at the center or middle of it, and I also make another slot or groove, $a^4$, in the top piece, extending from the upper part of the other slot $a^3$ to one side of the top piece, which has a hole, $a^5$, formed in its other side. The metallic pin $a^6$, about three-fourths of an inch long, is passed into this hole through the slot $a^4$, and across the slot $a^3$, and is surrounded by the spiral spring $a^7$.

The rubber stopple B is about three-quarters of an inch in thickness, and has a cavity or hole, *b*, formed or sunken in it at its center, about three-eighths of an inch deep from its upper side, and of a form corresponding to the form of the neck $a^1$ and button $a^2$ of the metallic stopple.

The bail C of bent wire passes through the slot $a^3$ in the top part of the metallic stopple, and its bent ends *c c* are inserted in the loops *d′ d′* of the wire lever D.

Two sockets, *e e*, are made in the bottle E opposite to each other, and adapted to hold the bent ends *d d* of the lever-wire D, and allow them to turn freely in the sockets. The wire lever D is bent from a piece of wire into a middle U part, the loops or eyes *d′ d′*, and the ends or pivots *d d*.

The button $a^2$ and the neck $a^1$ of the metallic stopple are forced, by hand, into the cavity *b* of the rubber stopple, which covers the under side of the top *a* of the metallic stopple, as well as the button and neck, and is thus held firmly to the metallic stopple by its own elasticity. The rubber stopple may also be separated readily by hand from the metallic stopple for cleansing the rubber stopple, or renewing either member of the stopper. The slot $a^3$ in the top of the metallic stopple allows the bail C to be secured to the metallic stopple by simply passing it through the slotted top part of the metallic stopple.

The ends *d d* of the lever-wire D are sprung into and out of the sockets *e e* in the bottle in which they are held, and turn freely, thus securing the lever to the bottle without any neck-wire or collar, and allowing the bottle-stopper to be removed from a broken bottle and applied to a new one without loss of neck-band.

The sockets *e e* are fixed in position to suit the lever-wire D, the pivots of which must enter the sockets to secure the bottle-stopping device to the bottle. Consequently no skill or care is required to see that the pivots of the lever-wire D come in correct position with reference to the leverage in applying the bottle-stopper to the bottle.

By making the sockets *e e* in the bulge part of the bottle-mouth a shorter bail may be used, and the lever-wire may be applied to bottles of shorter necks.

The metallic stopple is held by the bail C, which is connected to the bottle by the wire lever D. The mouth is stopped by pressing upon the loops *d d* or U part of the lever-wire with the bottle-stopper in the position shown in Fig. 3, which depresses and secures the stopple in the mouth, where it is held by the lever-wire; and the bottle is opened by pressing with the thumb upon the loops $d'$ $d'$, which turns the lever-wire off into the position shown in Fig. 3, and raises the rubber stopple out of the mouth.

When the bottle-stopper is intended for bottles containing soda-water, the metallic stopper or top $a$ is made of a circular form at its upper side, and a trifle smaller in diameter than the hole in the tube in the bottling-machines through which the cork is pushed in the old way, so as to allow it to pass through freely.

The button or bottom of the metallic stopper is of a size to allow it to have a rubber covering, and still pass through the machine freely, and likewise be sufficiently tight to retain the gas in bottle while being pushed through the machine.

The horizontal slot or groove is made in the side of the metallic stopper or top, in order that the wire bail may be connected to it, while the plunger, which pushes it through the machine against the gas, holds the stopper in the bottle when it is turned into the groove or slot. The little pin $a^6$, having the spring $a^7$ behind it, flies back and allows the bail to drop into the bottom of the perpendicular slot or groove. Then it springs out over the top of the wire bail, securing it to the stopper. By pushing the little pin back it allows the bail to come out of the groove or slot, thereby disconnecting the stopple from the bail—likewise from the bottle—so that it can be again pushed through the machine as long as it may last.

In this invention I do not confine myself to the lever-wires for depressing and securing the stopple. The bail C may be turned into the groove on top of the pin $a^6$ and rest on it, and thus hold the stopple into the bottle. By forcing the pin $a^6$ back from under the bail the elasticity of the rubber will raise the stopple out of the nose of the bottle.

Having thus described my invention, what I claim as new, and desire to secure by Letters Patent, is—

1. In combination, metallic stopple A, rubber stopple B, wire bail C, wire lever D, metallic pin $a^6$, and spiral spring $a^7$, as set forth and described, for the purpose specified.

2. The sockets in the bottle, whereby the lever is secured and pivoted to the bottle, in combination with the lever connecting the bail with the bottle, substantially as described.

3. A bottle-stopper, composed of a metallic stopple, slotted at its upper side for the passage of a bail, and constructed with neck and button at its under side, and a rubber stopple, having a cavity in its upper side of corresponding form to the neck and button of the metallic stopple, to which it is secured by its own elasticity, in combination with the wire lever D, connected with the metallic stopple by a bail passed through the slot in the metallic stopple, substantially as described.

4. A metallic stopple, constructed with button and neck at its under side, covered by a rubber stopple, and with circular top, provided with a perpendicular slot and a horizontal slot in the side of the top part, whereby the stopple may be pushed through the tube of the bottling-machine, and the bail may be connected with it while the plunger holds the stopple in the bottle, substantially as described.

AUGUSTUS E. RICH.

Witnesses:
JOHN HENESSY,
ROLAND W. SNOW.